United States Patent
Watanabe et al.

(10) Patent No.: US 8,169,514 B2
(45) Date of Patent: May 1, 2012

(54) DEFECTIVE PIXEL DETECTING DEVICE, DEFECTIVE PIXEL DETECTING METHOD, RECORD MEDIUM STORING A PROGRAM FOR DETECTING DEFECTIVE PIXELS, AND IMAGING APPARATUS

(75) Inventors: Setsuko Watanabe, Osaka (JP); Nobuo Iwai, Osaka (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/544,401

(22) Filed: Aug. 20, 2009

(65) Prior Publication Data

US 2010/0073526 A1  Mar. 25, 2010

(30) Foreign Application Priority Data

Aug. 21, 2008 (JP) .................................. 2008-212324

(51) Int. Cl.
*H04N 9/64* (2006.01)
(52) U.S. Cl. ....................................... 348/247; 348/246
(58) Field of Classification Search .................. 348/246, 348/247, 241
See application file for complete search history.

(56) References Cited

U.S. PATENT DOCUMENTS

| 2005/0078204 A1 | 4/2005 | Matsuoka et al. |
| 2006/0050158 A1* | 3/2006 | Irie ................................ 348/246 |
| 2011/0090381 A1* | 4/2011 | Cote et al. ...................... 348/246 |

FOREIGN PATENT DOCUMENTS

| JP | 6-315112 | 11/1994 |
| JP | 7-59011 | 3/1995 |
| JP | 2005-123873 | 5/2005 |

* cited by examiner

*Primary Examiner* — Tuan Ho
(74) *Attorney, Agent, or Firm* — Wenderoth, Lind & Ponack, L.L.P.

(57) ABSTRACT

A defective pixel detecting device determining defective pixels as correction targets in an imaging device that produces image signals is provided, and the device includes: defect information storage configured to store priority of defective pixels to be corrected; a defective pixel detector configured to detect defective pixels by comparing levels of imaging signals from the imaging device with a predetermined detection level; a priority setter configured to set priority of the detected defective pixels, based on the levels of the imaging signals of the defective pixels detected by the defective pixel detector; and a correction target determiner configured to newly determine defective pixels to be corrected based on the priority of the defective pixels out of the defective pixels that are currently detected by the defective pixel detector and the defective pixels to be corrected stored in the defect information storage, determining priority of the newly determined defective pixels to be corrected, and storing the priority of the newly determined defective pixels to be corrected in the defect information storage.

16 Claims, 10 Drawing Sheets

Fig. 3A  PREVIOUS DEFECTIVE PIXEL CORRECTION TARGETS

Fig. 3B  CURRENT DEFECTIVE PIXEL DETECTION RESULT

Fig. 3C  SORT BY DEFECT CORRECTION PRIORITY

Fig. 3D  WHEN SAME PIXEL APPEARS MORE THAN ONCE, LEAVE THE ONE WITH HIGHER DEFECT CORRECTION PRIORITY AND REMOVE THE OTHER

Fig. 3E  8 PIXELS IN DESCENDING ORDER OF PRIORITY ARE NEWLY DETERMINED AS DEFECTIVE PIXEL CORRECTION TARGETS

Fig.5

Fig.6A  PREVIOUS DEFECTIVE PIXEL CORRECTION TARGETS

Fig.6B  CURRENT DEFECTIVE PIXEL DETECTION RESULT

Fig.6C  CURRENT DETECTION RESULT (FIG. 6B) IS SHIFTED TO HIGHER PRIORITY SIDE

Fig.6D  ALIGN PIXELS IN FIG. 6A AND FIG. 6B ALTERNATELY

Fig.6E  WHEN SAME PIXEL APPEARS MORE THAN ONCE, LEAVE THE ONE WITH HIGHER PRIORITY AND REMOVE THE OTHER

Fig.6F  8 PIXELS IN DESCENDING ORDER OF PRIORITY ARE NEWLY DETERMINED AS DEFECTIVE PIXEL CORRECTION TARGETS

DEFECTIVE PIXEL DETECTING DEVICE, DEFECTIVE PIXEL DETECTING METHOD, RECORD MEDIUM STORING A PROGRAM FOR DETECTING DEFECTIVE PIXELS, AND IMAGING APPARATUS

BACKGROUND ART

1. Technical Field

The technical field relates to a defective pixel detecting device for detecting defective pixels of a solid-state imaging device, a defective pixel detecting method, a recording medium storing a program for detecting defective pixels, and an imaging apparatus.

2. Related Art

Solid-state imaging devices such as CCDs made of semiconductor often include defective pixels due to local crystal defects in the semiconductor. It is known that image degradation due to imaging output of such defective pixels, or so-called white spots or black spots, may occur in an image taken by a solid-state imaging device including the defective pixels.

Accordingly, in the recent years, a defect detecting and correcting system has been proposed that detects and corrects defective pixels with a solid-state imaging device being set in a video camera and such. With this type of defect detecting and correcting systems, when scanning and detecting within a one screen, defective pixels are sequentially detected from an edge of the screen, and defection data as information relating to the detected defective pixels is sequentially stored in a memory. The defection data stored when each defective pixel is detected includes address data that specifies an absolute position of the defective pixel on the screen and/or a defection level as a video signal level of the defective pixel.

When actually mounting such a defect detecting and correcting system in a device such as a video camera, an amount of defection data that can be stored is limited by a storage capacity of a memory mounted in the device.

According to this defect detecting and correcting system, a checkup for defective pixel detection is sequentially carried out from a first line within a screen, and defection data for the detected defective pixels is stored in a memory in real time when defective pixels are detected, thereby completing the scanning of a single frame. Therefore, when a number of the defective pixels that are present is over the storage capacity of the memory, defection data for defective pixels that are detected after the number of detected defective pixels exceeds the memory capacity cannot be stored in the memory. Thus, a problem has been noted that defects are corrected only for a first half of the screen, for example.

Thus, a technique for detecting and correcting defective pixels over an entire screen by effectively using a memory with a limited storage capacity, for example, are disclosed in Patent Documents 1 to 3.

According to a conventional defect detecting and correcting system disclosed in JP-A-06-315112 (Patent Documents 1), when detecting defective pixels by comparing an imaging output level of a solid-state imaging device with a predetermined threshold value (detection level), re-detection is carried out with lowered detection sensitivity by increasing the predetermined detection level if a number of the detected defective pixels exceeds an allowable number for storage corresponding to the storage capacity of the memory. The re-detection is repeated until the number of defective pixels becomes equal to or smaller than the allowable number for storage. With this, the detection and correction of the defective pixels over an entire screen can be carried out by effectively using a memory with a limited storage capacity.

Further, according to a conventional defect detecting and correcting system disclosed in JP-A-07-59011 (Patent Documents 2), defective pixels are detected and the defective pixels of an allowable number for storage corresponding to the storage capacity of a memory are stored, and then, defection levels of the detected defective pixels are compared with defection levels of the defective pixels stored in the memory. If it is determined that the defection level of a detected defective pixel is greater than the defection level of a stored defective pixel, the defective pixel with a smaller defection level is replaced with the defective pixel with a greater defection level and stored in the memory. With this, the defective pixels are detected and corrected from the pixel with a higher defection level until the number of defective pixels reaches the allowable number for storage corresponding to the storage capacity of the memory.

Moreover, according to a conventional defect detecting system disclosed in JP-A-2005-123873 (Patent Documents 3), a different detecting method is disclosed as follows in addition to the method according to JP-A-07-59011 described above. That is, this detecting method is configured to store detection time(date) as attribute information of defective pixels in place of the defection levels. Specifically, after the defective pixels are detected and the defective pixels of allowable number for storage corresponding to the storage capacity of the memory are stored, defective pixels that are detected currently are stored in the memory in place of defective pixels whose detection time(date) are older.

Furthermore, according to a conventional defect detecting system disclosed in JP-A-2005-123873, both of the defection level and the detection time can be stored as attribute information of defective pixels, and the sorting as described above can be carried out based on one of the defection level and the detection time.

However, according to the above described conventional configurations, it is possible to carry out defective pixel correction by selecting a pixel with higher priority from the pixels that have been detected during the defective pixel detection, but there is a problem that no countermeasure is taken in a case when a pixel that should be normally corrected cannot be detected. Further, defective pixel has a property of changing the signal level according to temperature and charge accumulation time. If the defection level of a defective pixel is accidentally low during the defective pixel detection, such a defective pixel cannot be detected, and accordingly possibly remains uncorrected.

SUMMARY

In view of the above problems, a defective pixel detecting device, a defective pixel detecting method, a recording medium storing a program for detecting defective pixels, and an imaging apparatus according to the present embodiment aim to detect pixels that should be normally corrected more unfailingly.

In order to address the problems described above, a defective pixel detecting device according to the first aspect is capable of determining defective pixels as correction targets in an imaging device that produces image signals, and the device includes: a defect information storage configured to store priority of defective pixels to be corrected; a defective pixel detector configured to detect defective pixels by comparing levels of imaging signals from the imaging device with a predetermined detection level; a priority setter configured to set priority of the detected defective pixels, based on the levels of the imaging signals of the defective pixels detected by the defective pixel detector; and a correction target determiner configured to newly determine defective pixels to be corrected based on the priority of the defective pixels out of the defective pixels that are currently detected by the defective pixel detector and the defective pixels to be corrected stored in the defect information storage, determining priority of the newly determined defective pixels to be corrected, and storing the priority of the newly determined defective pixels to be corrected in the defect information storage.

An imaging apparatus according to the second aspect includes: an imaging device that produces image signals; and the defective pixel detecting device as described above.

Further, defective pixel detecting method according to the third aspect is capable of determining defective pixels as correction targets in an imaging device that produces image signals, and the method includes: a defective information storing step for storing priority of defective pixels to be corrected in the defect information storage; a defective pixel detecting step of detecting defective pixels by comparing levels of imaging signals from the imaging device with a predetermined detection level; a priority setting step for setting priority of the detected defective pixels, based on the levels of the imaging signals of the defective pixels detected by the defective pixel detecting step; and a correction target determining step for determining newly defective pixels to be corrected based on the priority of the defective pixels out of the defective pixels that are currently detected and the defective pixels to be corrected stored in the defect information storage, determining priority of the newly determined defective pixels to be corrected, and storing the priority of the newly determined defective pixels to be corrected in the defect information storage.

Moreover, a recording medium according to the fourth aspect has a program for detecting defective pixels capable of determining defective pixels as correction targets in an imaging device that produces image signals, and the program causes a computer to function as: a defect information storage configured to store priority of defective pixels to be corrected; a defective pixel detector configured to detect defective pixels by comparing levels of imaging signals from the imaging device with a predetermined detection level; a priority setter configured to set priority of the detected defective pixels, based on the levels of the imaging signals of the defective pixels detected by the defective pixel detector; and a correction target determiner configured to newly determine defective pixels to be corrected based on the priority of the defective pixels out of the defective pixels that are currently detected by the defective pixel detector and the defective pixels to be corrected stored in the defect information storage, determining priority of the newly determined defective pixels to be corrected, and storing the priority of the newly determined defective pixels to be corrected in the defect information storage.

According to the above aspects, it is possible to diminish image degradation even if pixels that are actually defective and to be corrected are not detected in immediate defective pixel detection. Specifically, pixels that are stored in a defect information storing memory as defective pixels in a previous defection detecting process are highly possibly stored as defective pixels again in a defective pixel detecting process of this time, thereby diminishing the image degradation. Further, the priority is assigned to the defects in the same defective pixel detection result, and the correction targets are newly determined based on comparison with the priority of the past correction targets, and therefore it is possible to reduce adverse effects of differences in temperature and charge accumulation time that can occur due to differences in timing of the defective pixel detection, thereby allowing adequate detection of the pixels to be corrected.

DETAIL DESCRIPTION OF PREFERRED EMBODIMENT

Figure 1:
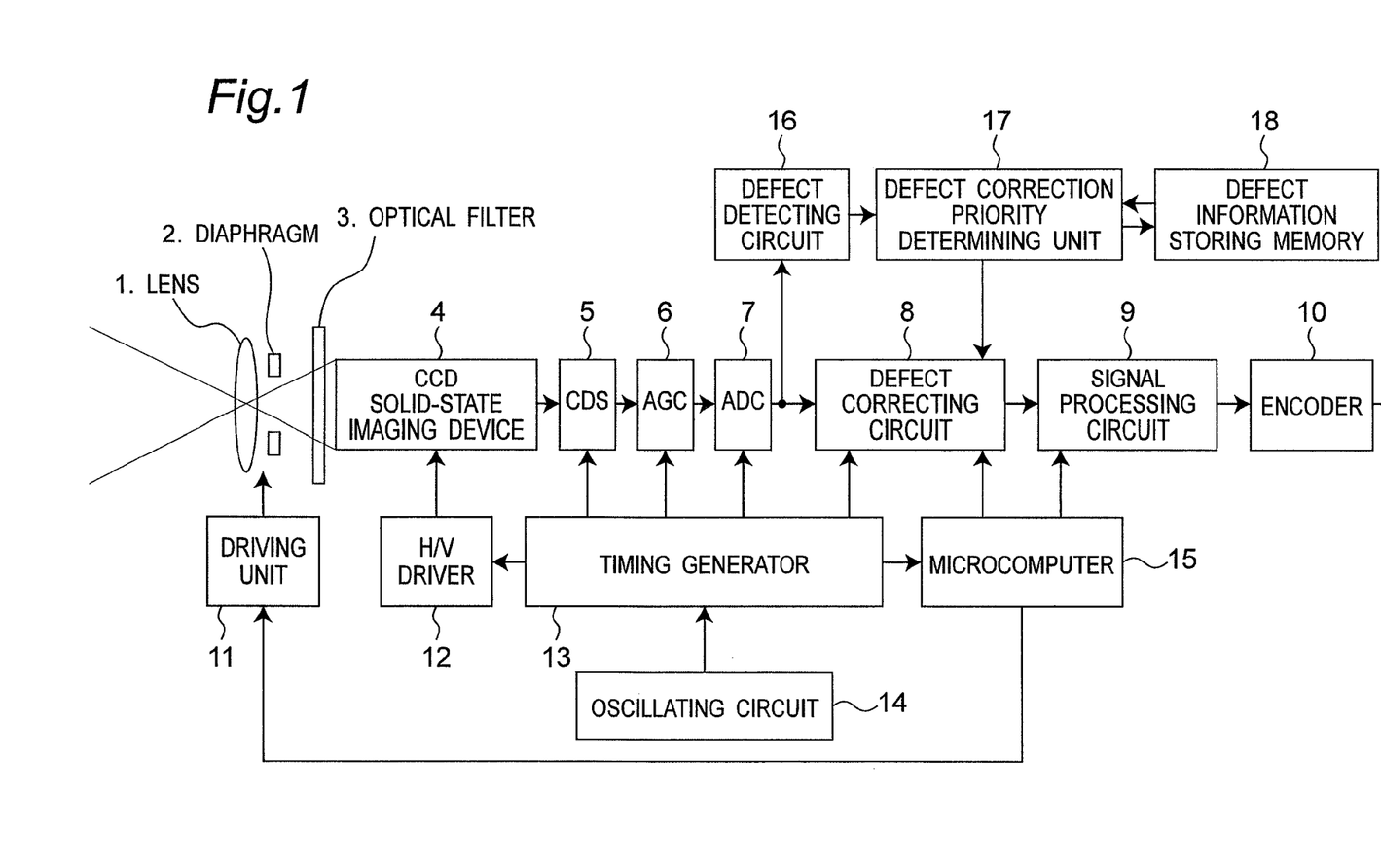
FIG. 1 is a block diagram illustrating a configuration of a defective pixel correcting apparatus according to a first embodiment.

The following describes preferred embodiments with reference to the drawing.
(First Embodiment)
1. Configuration FIG. 1 is a block diagram illustrating a configuration of a video camera to which a defective pixel correcting apparatus according to a first embodiment is applied. This embodiment explains an example in which defect (white spot) correction is carried out by applying the defective pixel correcting apparatus to a video camera using a CCD solid-state imaging device.

The video camera is provided with a lens 1, a diaphragm 2, an optical filter 3, a CCD solid-state imaging device 4, a CDS (correlated double sampling circuit) 5, an AGC (automatic gain control circuit) 6, an ADC (A/D converter) 7, a defect correcting circuit 8, a signal processing circuit 9, an encoder 10, a driving unit 11, an H/V driver 12, a timing generator 13, an oscillating circuit 14, and a microcomputer 15.

An image of a subject is formed on an imaging plane of the CCD solid-state imaging device 4 via an optical system including the lens 1, the diaphragm 2, and the optical filter 3. The lens 1, the diaphragm 2, and the optical filter 3 are driven accordingly by the driving unit 11 that is controlled by the microcomputer 15.

The timing generator 13 sends a vertical clock signal and a horizontal clock signal supplied from the oscillating circuit 14 to the H/V driver 12. The H/V driver 12 carries out reading of a signal charge of a vertical transfer register from each pixel of the CCD solid-state imaging device 4, vertical transfer by the vertical transfer register, horizontal transfer by the horizontal transfer register, and so on. As a result, a video signal for imaging the subject is outputted from the CCD solid-state imaging device 4. The timing generator 13 also supplies clock signals to the CDS (correlated double sampling circuit) 5, the AGC (automatic gain control circuit) 6, the ADC (A/D converter) 7, and the defect correcting circuit 8.

The video signal from the CCD solid-state imaging device 4 is subjected to A/D conversion by the ADC 7 after passing through the CDS 5 and the AGC 6, and then provided for the defect correcting circuit 8.

The video signal corrected by the defect correcting circuit 8 is subjected to various signal processing by the signal processing circuit 9, is coded by the encoder 10, and is outputted.

Figure 2A:
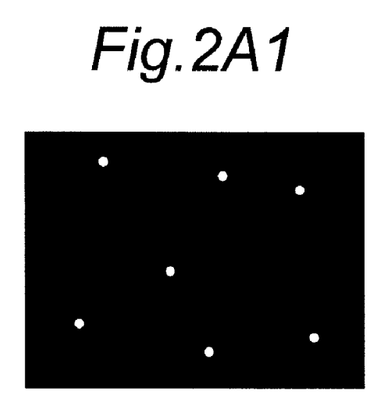
FIG. 2 is an illustration of examples of defective pixels (white spots).

Detection of defective pixels (in this embodiment, white spots, that is, pixels that are always high luminance no matter what type of imaging subject are captured) is carried out in a state in which the diaphragm 2 is closed such as when power is turned on or when adjusting black balance. As no light enters through the lens 1 when the diaphragm 2 is closed, an entire screen expressed by the video signal outputted from the CCD solid-state imaging device 4 is shown dark. FIG. 2 shows examples of the defective pixels. In case of the white spots, the defective pixels are shown as spots with high luminance (white spots) as shown in FIG. 2A1. The video signal is given to a defect detecting circuit 16, and the defect detecting circuit 16 detects position information and a defection level for each defective pixel in the screen. The defection level can be a video signal level, or more specifically a luminance value, of the defective pixel.

A defect information storing memory 18 stores information of defective pixels that have been selected as correction targets pixels in an immediately previous defective pixel detecting process. The information of the defective pixels includes position information and defect correction priority (will be later described) of the pixels. A defect correction priority determining unit 17 determines a rank order of priority of defective pixels to be corrected, using the position information and the defect correction priority of the defective pixels stored in the defect information storing memory 18, as well as the position information and the defection levels of the defective pixels detected by the defect detecting circuit 16. The determined rank order is newly set as defect correction priority, and a predetermined number of defective pixels in order from a pixel with higher defect correction priority are selected as defective pixels to be corrected. The defect information storing memory 18 stores the position information and the defect correction priority of the selected defective pixels in place of those of the pixels that have been already stored. The stored defect pixel information is used in a defective pixel correcting process by the defect correcting circuit 8, as well as in the determination of the defect correction priority next time.

Figure 2A:
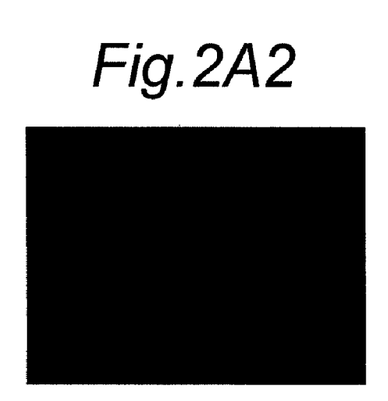

The defective pixel information is given to the defect correcting circuit 8, and the defect correcting circuit 8 carries out the correction. While various known techniques using pixel values of pixels that surround a target pixel can be used for the defective pixel correcting process, detailed description will not be given here. As a result of the correcting process, the defective pixels as shown in FIG. 2A1, for example, are corrected to a state as shown in FIG. 2A2.

2. Method of Determining Defect Correction Priority

The following describes a method of determining the defect correction priority by the defect correction priority determining unit 17. Two important factors for the priority determination according to the present embodiment are "history of determination of correction target (defect detection result)" and the "defection level".

In the defective pixel detection, there is a case in which the defective pixels cannot be detected for some reason. Therefore, by taking into account the history of the previous determination of the correction targets, instead of using a detection result of only a single detecting process, it is possible to reduce an adverse effect of false detection.

Figure 2B:
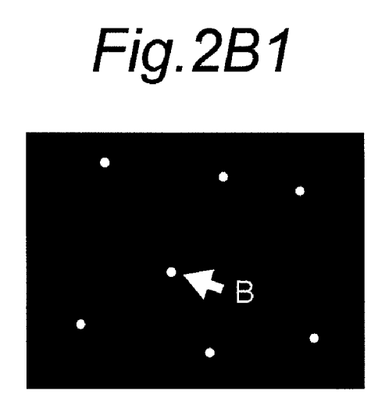
Figure 2B:
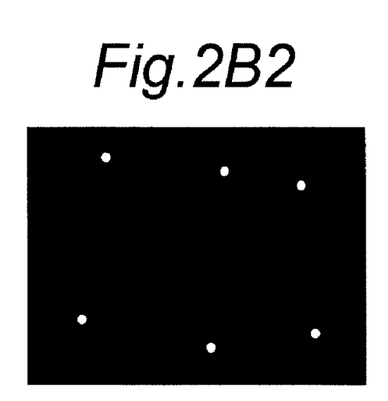
Figure 2C:
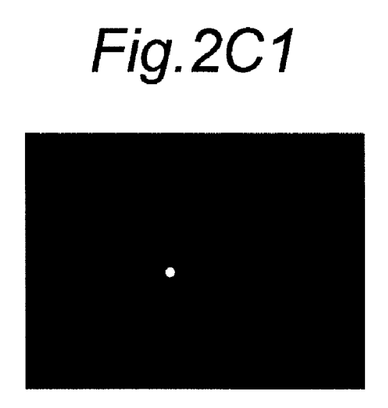
Figure 2C:
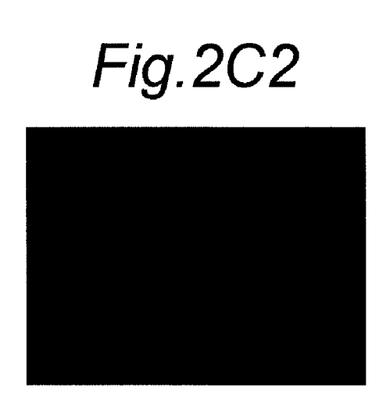

The defects include a blinking defect that changes its defection level at a certain cycle. The blinking defect visually stands out as it blinks, and thus should be corrected with high priority. Such a defect can be detected or cannot be detected depending on a timing of the defective pixel detection. A defect B is expressed as a defect as shown in FIG. 2B1 at one detection timing, and is not expressed as a defect as shown in FIG. 2B2 at a different detection timing, and consequently the defect B cannot be detected. When the blinking defect B is not detected and not selected as a correction target in this manner, the blinking defect B remains uncorrected as shown in FIG. 2C1.

Further, the defection level varies according to temperature and charge accumulation time of the CCD solid-state imaging device 4. In a case of a defective pixel whose defection level is originally high, the defection level would further increase in a situation where the temperature becomes higher and the charge accumulation time becomes longer. Therefore, such a defective pixel having originally a high defection level should be corrected with high priority as it makes the presence of the defect in a video image highly visible. Therefore defection level should be considered.

Generally, an LRU (Least Recently Used) method as described below is known as one example of a sorting algorithm using past history.

With the LRU method, when caching or in a paging process, a process of allocating data that has been accessed frequently in a high speed memory and data that has been accessed less frequently in a main memory or disk that is slower is carried out. In general, the data that has been accessed less frequently tends to remain infrequently accessed in the future as well, and this method is defined based on such a premise. By using the LRU method, advantageous effects can be expected such as increasing a cache hit ratio, and reducing frequency of access to a disk in a virtual storage.

In this embodiment, by using an idea of the LRU method, the pixels as targets of defective pixel correction are newly selected based on the current defective pixel detection result and the defective pixel information stored in the defect information storing memory 18. The basic idea is as follows.

1. Provisional defect correction priority is assigned to defective pixels that have been detected currently in descending order of the defection level. For all the pixels including the defective pixels that have been detected currently and pixels as the previous defective pixel correction targets, the defect correction targets are determined so that the correction is preferentially carried out from a pixel with higher defect correction priority. Instead of using the defection level directly as an absolute value, a rank order when the pixels are sorted in descending order of the defection level is used as the provisional defect correction priority.

2. When the defect correction priority of a current defective pixel correction target stored in the defect information storing memory 18 is equal to the provisional defect correction priority of a defective pixel that has been detected currently, higher priority is assigned to the defective pixel that has been detected currently.

3. For a defective pixel that is redundantly included in the current defective pixel detection result and the defective pixel information stored in the defect information storing memory 18, highest defect correction priority out of those assigned to this pixel in the respective data is employed as the defect correction priority of this defective pixel.

The following describes the method of determining the defect correction priority taking an example.

FIG. 3 is an illustration of the method of determining the defect correction priority according to this embodiment, where a number of defective pixels that can be detected by the defect detecting circuit 16 is 5, and a number of defective pixels that can be stored in the defect information storing memory 18 is 8. In FIG. 3A to FIG. 3E, boxes aligned left to right represent pixels, and an order from left to right indicates the defect correction priority. In this example, the defect correction priority is expressed by a value from 1 to 8, and the smaller the value is, the higher the defect correction priority is. That is, the defect correction priority of a pixel with highest defect correction priority is "1". In the drawing, the priority is higher on the left side. It should be understood that a greater value can be assigned to a pixel with higher defect correction priority (for example, a pixel with highest defect correction priority is assigned with 8, and a pixel with lowest defect correction priority is assigned with 1).

Figure 3A:
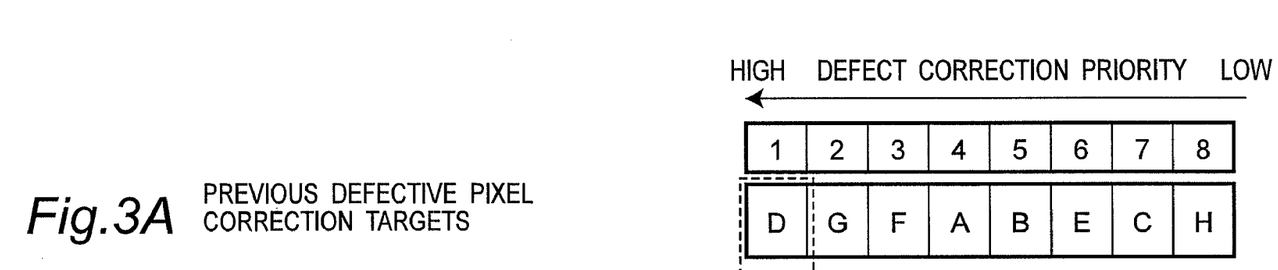
FIG. 3 is an illustration of a sequence for determining defect correction priority according to the embodiment.

The correction target pixels stored in the defect information storing memory 18, that is, the pixels that have been selected as targets of the defective pixel correction in the immediately previous defective pixel detecting process, are represented by "D, G, F, A, B, E, C, H" in descending order of the defect correction priority. For example, the defect correction priority of a pixel D is 1, and the defect correction priority of a pixel G is 2. FIG. 3A shows a state where these pixels are aligned in order of the defect correction priority.

Figure 3B:
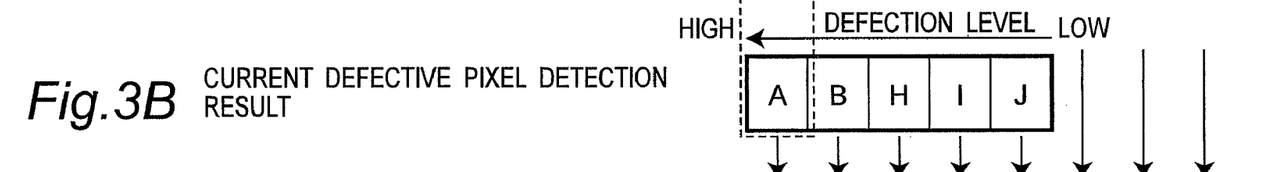

Further, the defective pixels that have been detected in the current defective pixel detecting process are represented by "A, B, H, I, J" in descending order of the defection level. These pixels are aligned in order of the defection level as shown in FIG. 3B, and are assigned with values from 1 to 5 as provisional defect correction priority in descending order of the defection level. For example, the defect correction priority of a pixel A is 1, and the defect correction priority of a pixel B is 2. It should be understood that, when a greater value is assigned to a pixel with higher defect correction priority recorded in the defect information storing memory 18 as described above, a greater value can be assigned as the provisional defect correction priority in descending order of the defection level. For example, when a pixel with highest defect correction priority is assigned with 8 and a pixel with lowest defect correction priority is assigned with 1 for the pixels recorded in the defect information storing memory 18, a pixel with highest defection level is assigned with 8 and a pixel with lowest defection level is assigned with 4.

Figure 3C:
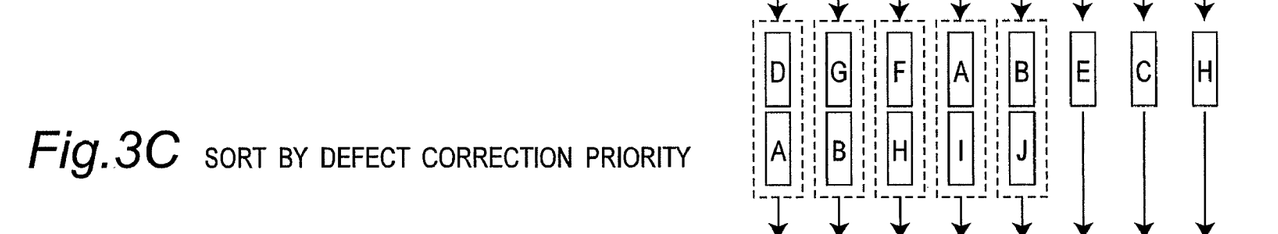

In the above described state, as shown in FIG. 3C, the defective pixels that have previously been the defective pixel correction targets (FIG. 3A) and the defective pixels that have been detected currently (FIG. 3B) are sorted in order of the defect correction priority. Pixels having the same defect correction priority are sorted such that the pixel in the current defective pixel detection result (FIG. 3B) is given higher final priority (such that the pixel comes on the left side). For example, in FIG. 3A and FIG. 3B, the defect correction priority of the pixel D as the previous correction target and the pixel A in the current detection result is 1, and the pixels are sorted in order of A and D such that the pixel A in the current detection result is given higher priority as shown in FIG. 3C. Other pixels are also sorted in the same manner.

Figure 3D:
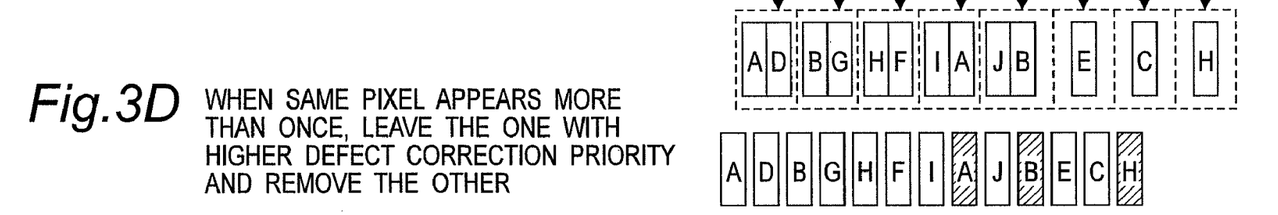

Further, when the same pixel appears more than once as in the case of the pixels A, B, and H, as shown in FIG. 3D, the one with higher priority (the pixel on the left side) is left and the one with lower priority (the other pixel) is removed. For example, as the pixel A appears first from the left and eighth from the left, the one that appears first from left is left and the other is removed. The same applies to the other pixels.

Figure 3E:
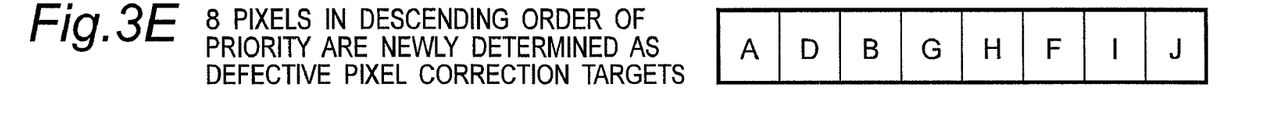

Out of the pixels that remain in this manner, 8 pixels are selected in descending order of the priority (from left), and determined to be correction targets for the current defective pixel detection result as shown in FIG. 3E. The 8 selected pixels are newly assigned with the defect correction priority in descending order of the priority. For example, the pixel A is assigned with priority 1, the pixel D is assigned with priority 2, and the pixel B is assigned with priority 3. It should be noted that whether or not the pixels are the same can be determined by comparing the position information of the pixels, and when the position information of the pixels is the same, the pixels are determined to be the same. The defect correction priority is determined according to the method as described above.

FIG. 4 is an illustration explaining one example of development of the defect correction priority when first to fourth defective pixel detection is carried out. Correction targets and their defect correction priority after the first defective pixel detection are as shown in FIG. 4E, according to a first defective pixel detection result (FIG. 4A). Correction targets and their defect correction priority after the second defective pixel detection (FIG. 4F) is obtained by sorting pixels in a second defective pixel detection result that are sorted in descending order of the defection level (FIG. 4B) and the first correction targets (FIG. 4E) such that the pixels in the second defective pixel detection result are given higher priority for each priority level.

Correction targets and their defect correction priority after the third defective pixel detection (FIG. 4G) is similarly obtained by sorting pixels in a third defective pixel detection result that are sorted in descending order of the defection level "A, E, H, G, J" (FIG. 4C), and the second correction targets "D, A, G, B, F, C, E" (FIG. 4F) such that the pixels in the third defective pixel detection result are given higher priority for each priority level.

In FIG. 4, the pixel B and a pixel C appear only in the first defect detection result, and accordingly, it is considered that the pixel B and the pixel C are blinking defective pixels that change the defection levels at a certain cycle. The blinking defect is a defect that visually stands out by blinking as described earlier, and therefore should be corrected with high priority. In view of the above characteristic of the blinking defect, this embodiment employs a mechanism such that, even if the defect of the pixel B and the pixel C is the blinking defect and the pixel B and the pixel C are not detected in the second and third defective pixel detecting processes, the pixel B and the pixel C remain as the correction targets with gradually lowering their defect correction priority, without immediately being excluded from a range of the correction targets. With this, it is possible to effectively address the correction of the blinking defect. In particular, if the defect information storing memory 18 has a sufficient capacity to cover a blinking cycle of the blinking defect, it is possible to detect the blinking defect again as the defective pixel before the blinking defect is excluded from the range of the correction targets, and its defect correction priority increases again, which proves highly effective.

A case is assumed in which, for example, the temperature of the CCD solid-state imaging device 4 at the third defective pixel detection is 30 degrees Celsius and the temperature at the fourth defective pixel detection is 40 degrees Celsius, which is higher than the temperature at the third defective pixel detection by 10 degrees Celsius. As the temperature of the CCD solid-state imaging device 4 increases, the defection level of each defective pixel increases and a defective pixel detection result (FIG. 4D) that is different from the third defect detection result at 30 degrees Celsius (FIG. 4C) is obtained. Correction targets and their defect correction priority after the fourth defective pixel detection (FIG. 4H) is similarly obtained by sorting pixels in a fourth defective pixel detection result that are sorted in descending order of the defection level "J, G, M, A, E" (FIG. 4D) and the correction targets "A, D, E, H, G, B, J, F" (FIG. 4G) obtained after the third detection such that the pixels in the fourth defective pixel detection result are given higher priority based on the priority levels.

Figure 4A:
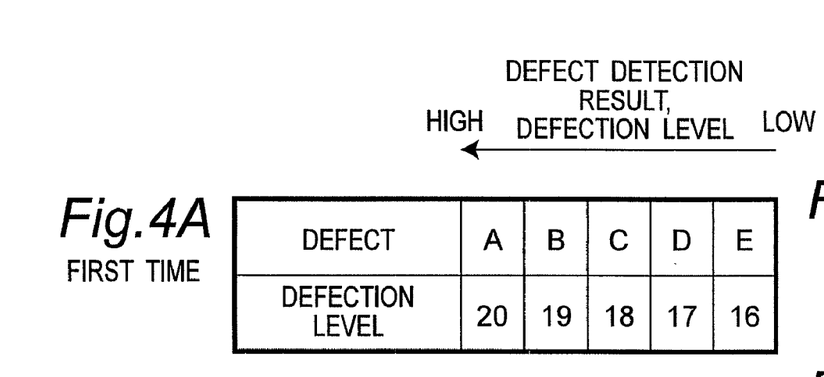
FIG. 4 is an illustration of a specific example of determination of the defect correction priority according to the embodiment.
Figure 4B:
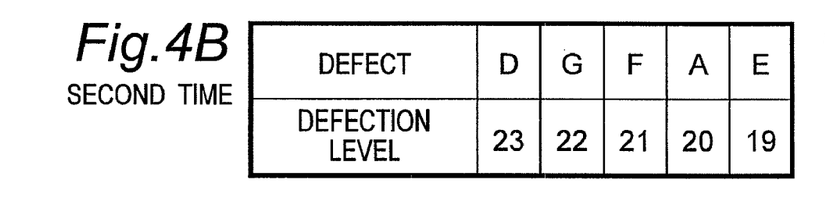
Figure 4C:
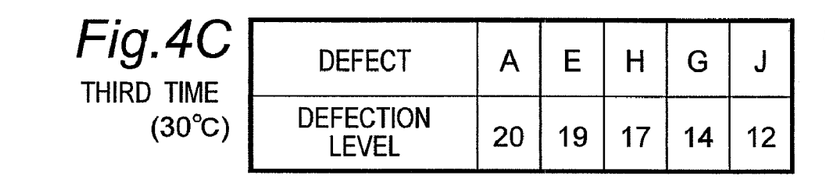
Figure 4D:
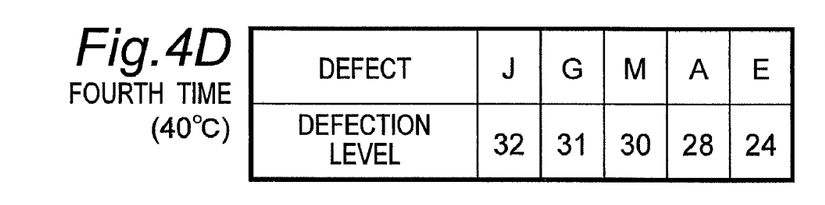
Figure 4E:
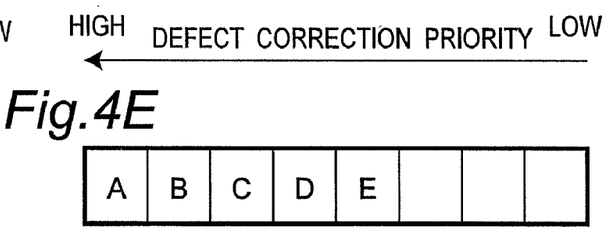
Figure 4F:
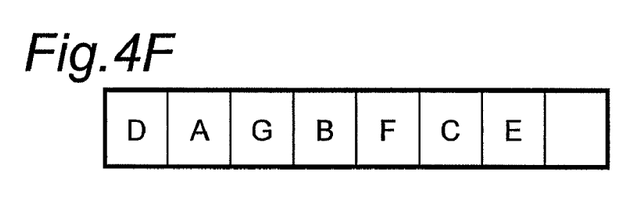
Figure 4G:
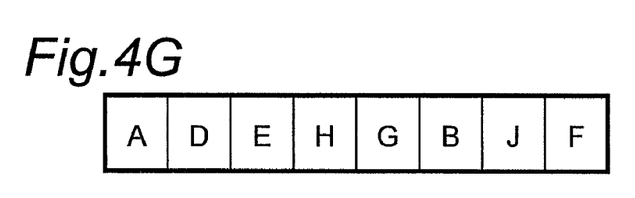

In FIG. 4D, the defection level of each pixel has increased to a large extent by the temperature rise compared to the case in FIG. 4C. However, this embodiment does not employ a method of determining the priority based on comparison between absolute values of the defection levels, and instead, employs a mechanism with which the temperature change may not cause a sharp change in the order of priority of the defect.

(Second Embodiment)

Figure 5:
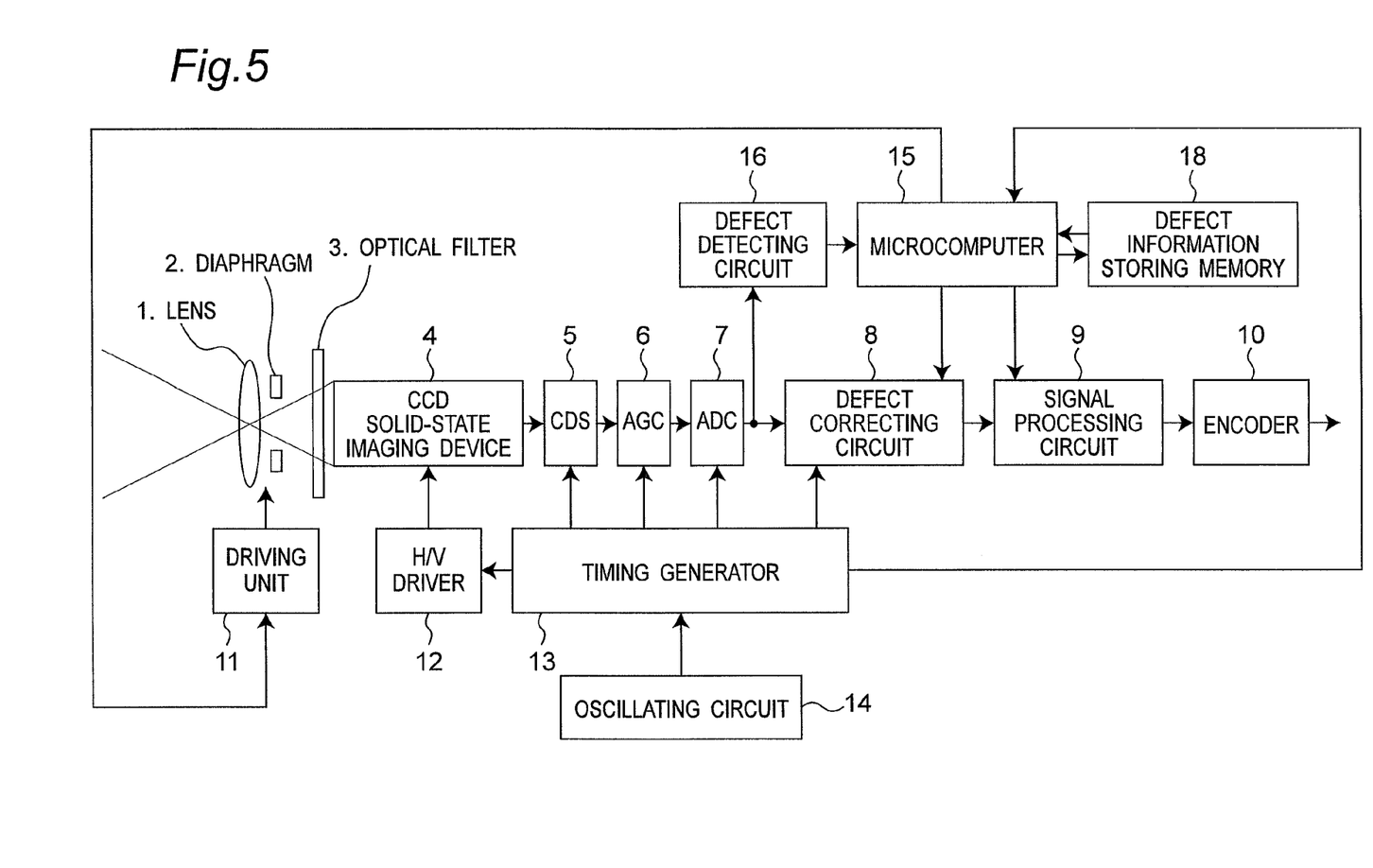
FIG. 5 is a block diagram illustrating a configuration of a defective pixel correcting apparatus according to a second embodiment.

FIG. 5 is a block diagram illustrating a configuration of a video camera to which a defective pixel correcting apparatus according to a second embodiment is applied. This embodiment also explains an example in which defect (white spot) correction is carried out by applying the defective pixel correcting apparatus to a video camera using a CCD solid-state imaging device.

This embodiment is different from the first embodiment in that the function of the defect correction priority determining unit 17 according to the first embodiment is realized by the microcomputer 15, and the other configuration is basically the same.

In the defect information storing memory 18, the position information and the defect correction priority of the defective pixels that have been selected as the correction target pixels in the immediately previous defective pixel detecting process are stored. The rank order of priority of correction of the defective pixels is determined by the microcomputer 15, using the position information and the defect correction priority of the defective pixels stored in the defect information storing memory 18, as well as the position information and the defection levels of the defective pixels detected by the defect detecting circuit 16. The rank order is newly set as defect correction priority, and a predetermined number of defective pixels in order from a pixel with higher defect correction priority are selected as defective pixels to be corrected. The defect information storing memory 18 stores the position information and the defect correction priority of the selected defective pixels in place of those of the pixels that have been already stored. The stored defect pixel information is used in a defective pixel correcting process by the defect correcting circuit 8, and in the determination of the defect correction priority next time.

Figure 6A:
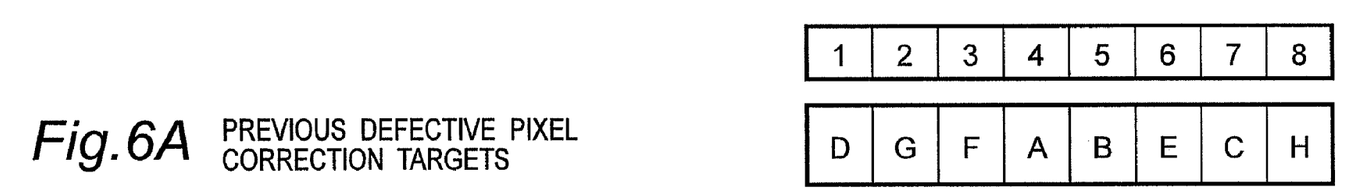
FIG. 6 is an illustration when the method of determining the defect correction priority is carried out by software process.
Figure 6B:
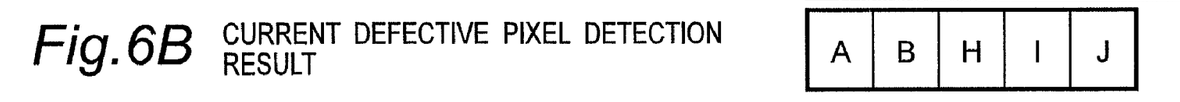
Figure 6C:
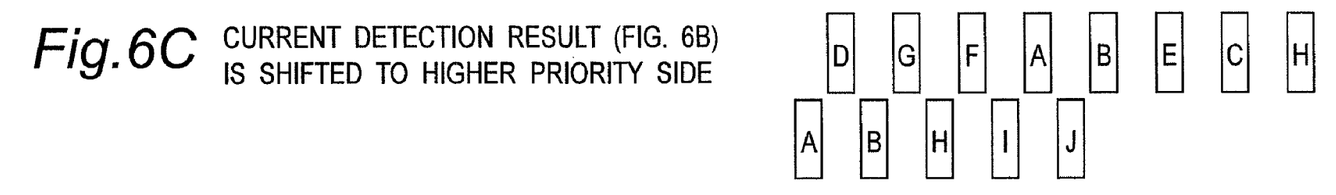
Figure 6D:
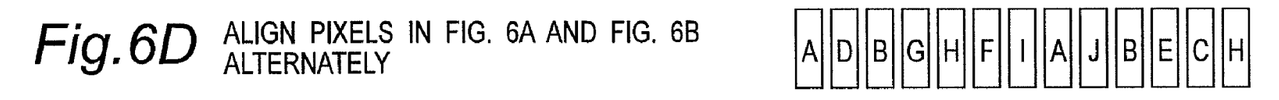
Figure 6E:
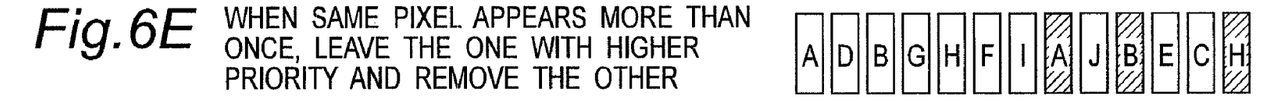
Figure 6F:
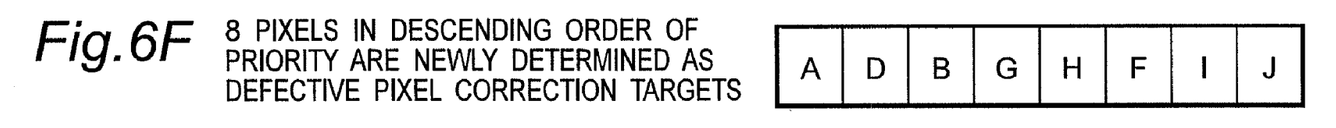
Figure 7:
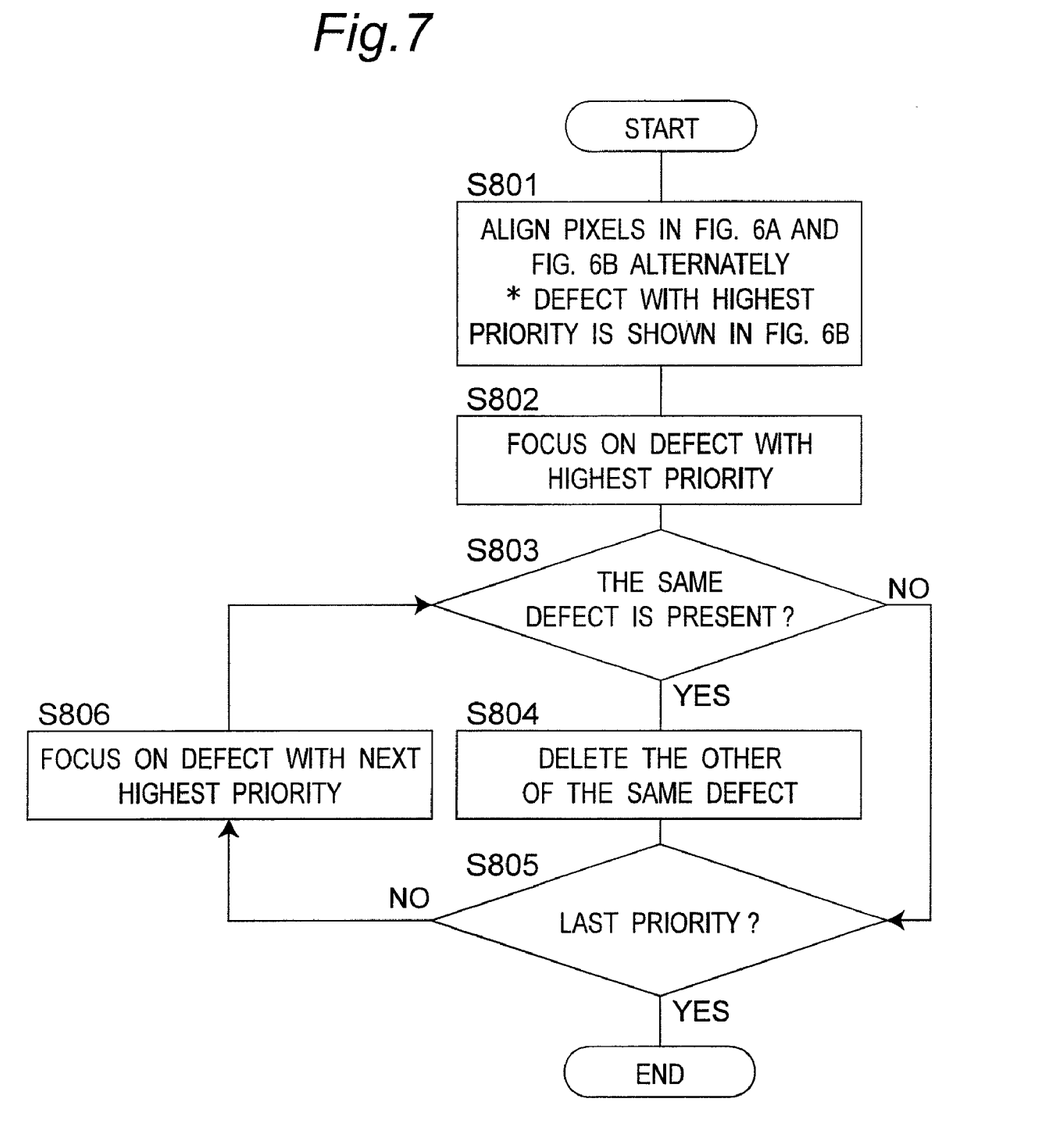
FIG. 7 is a flowchart of determination of the defect correction priority according to the embodiment.

Next, a software program that determines the defect correction priority in the microcomputer 15 is explained. FIG. 6 is an illustration when the software process is carried out by the method of determining the defect correction priority. Further, FIG. 7 is a flowchart of this process. This method of determination can be realized by describing the process shown in FIG. 6 in software. As shown in FIG. 6C, the current defective pixel detection result (FIG. 6B) is shifted to a higher priority side with respect to the previous defective pixel correction targets (FIG. 6A). Then, as shown in FIG. 6D, the pixels shown in FIG. 6A and the pixels shown in FIG. 6B are aligned alternately (S801). If the same pixel appears more than once in this array, the one with higher priority is left and the other is removed as shown in FIG. 6E (S802 to S806). Finally, as shown in FIG. 6F, 8 pixels out of the remaining ones are selected in descending order of the priority, and set as new defective pixel correction targets. This program is recorded in a recording medium such as a nonvolatile memory (not shown in the drawing), and loaded and executed by the microcomputer 15.

3. Other Examples

In the previously described embodiments, the newly detected defective pixels and the stored defective pixels are aligned alternately one by one, based on the position information and the priority determined based on the defection levels of the defective pixels that have been detected by the means of detecting the defective pixels, as well as on the position information and the priority of the defect correction target pixels stored in the means of storing the defect information. However, these pixels can be aligned alternately by plural pixels, such as two by two.

4. Consideration on Effectiveness of Embodiments Described Above

The effectiveness of the above described embodiments against the conventional techniques is considered. For this purpose, two examples of the conventional method of determining the defect correction priority will be described first.

A first example in which only the LRU method is used without using the defection levels is first explained.

FIG. 8 is an illustration of the conventional method of determining the defect correction priority according to the first example. In the following description, similarly to the first and second embodiments, a number of defective pixels that can be detected by a defective pixel detecting unit is 5, and a number of defective pixels that can be corrected by a defective pixel correcting unit is 8.

Figure 8A:
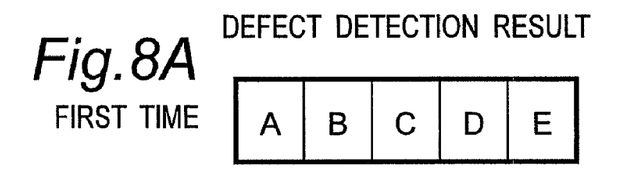
FIG. 8 is an illustration of a first example explaining effectiveness of the embodiments.
Figure 8B:
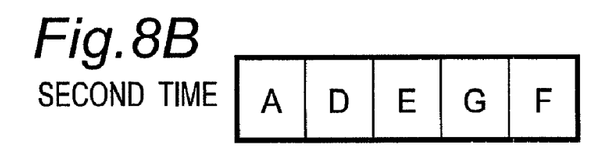
Figure 8C:
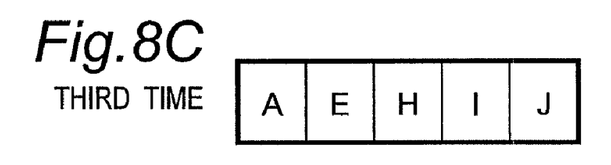
Figure 8D:
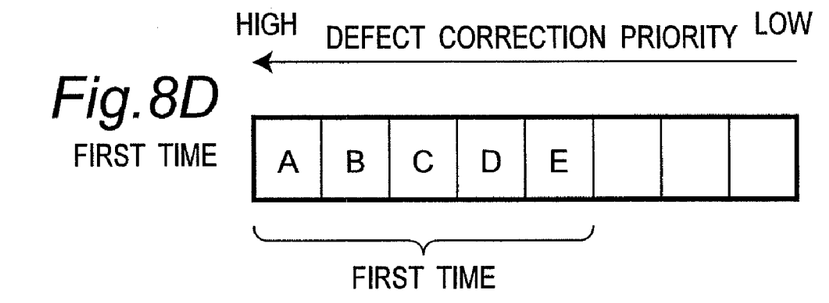
Figure 8E:
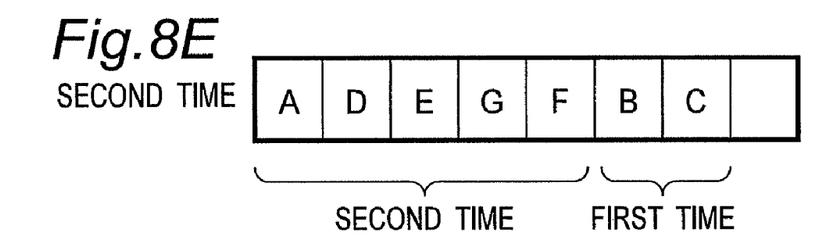
Figure 8F:
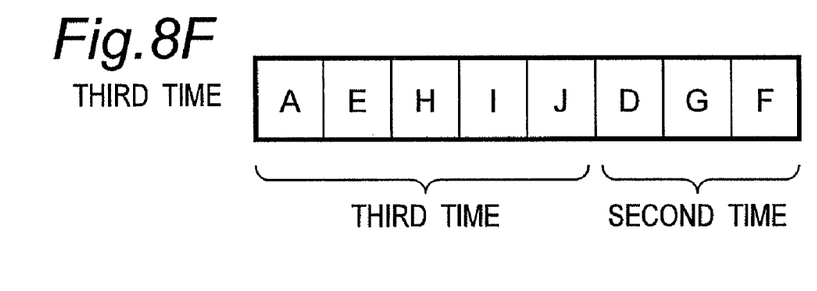

The defect correction priority after a first defect detection is as shown in FIG. 8D, using a first defect detection result (FIG. 8A) as it is. In determination of the defect correction priority after a second defect detection, first, the defect correction priority of the pixels in a second defect detection result "A, D, E, G, F" (FIG. 8B) is made higher. Then, the defect correction priority of the defective pixels "B and C" that are not included in the second defect detection result (FIG. 8B) out of the first defect correction priority "A, B, C, D, E" (FIG. 8D) are set to be second highest. In determination of a third defect correction priority (FIG. 8F), first, the defect correction priority of the pixels in a third defect detection result "A, E, H, I, J" (FIG. 8C) is made higher. Then, the defect correction priority of the defective pixels "D, G, and F" that are not included in the third defect detection result (FIG. 8C) out of the second defect correction priority "A, D, E, G, F, B, C" (FIG. 8E) are set to be second highest. The defect correction priority is determined in this manner.

In FIG. 8, the defect B and a defect C appear only in the first defect detection result, and are not detected in the subsequent detection. While the defect B and the defect C are possibly the blinking defective pixels that change the defection levels at a certain cycle as described previously, the defect B and defect C are immediately excluded from the third defect correction priority in the first example even if these defects are the blinking defects.

In contrast, according to the present embodiment, even if the defects are not detect in the second and third defective pixel detecting processes, as described previously, these defects would not be excluded immediately and remain as the correction targets at least for a while. Therefore, the present embodiment is more effective to the blinking defects.

Next, a second example in which the defection levels are taken into account of the method of determining the defect correction priority, in addition to the LRU method according to the first example, is considered. As a way to take the defection levels into account in the second example, the defection levels are used only when sorting the defect detection result in descending order of the defection level. According to this example of the conventional method, the defection levels are stored in the defect information storing memory, and the order of priority for defect correction is determined from a pixel with higher defection level.

FIG. 9 is an illustration of the second example of the conventional method of determining the defect correction priority. In the following description, similarly to the first and second embodiments, the number of defective pixels that can be detected by the defective pixel detecting unit is 5, and the number of defective pixels that can be corrected by the defective pixel correcting unit is 8.

Figure 9A:
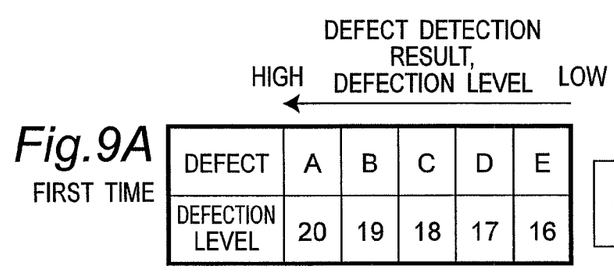
FIG. 9 is an illustration of a second example explaining effectiveness of the embodiment.
Figure 9B:
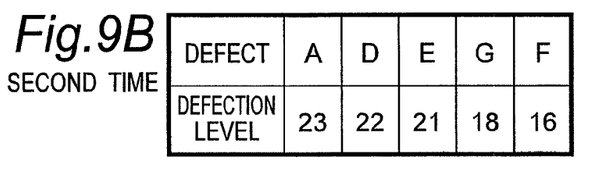
Figure 9C:
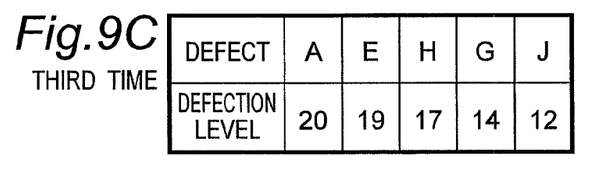
Figure 9D:
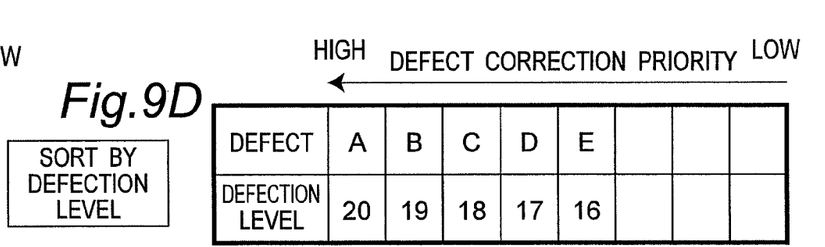
Figure 9E:
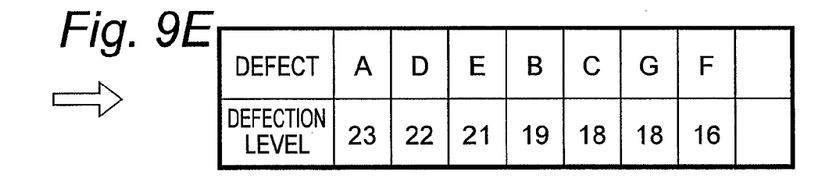
Figure 9F:
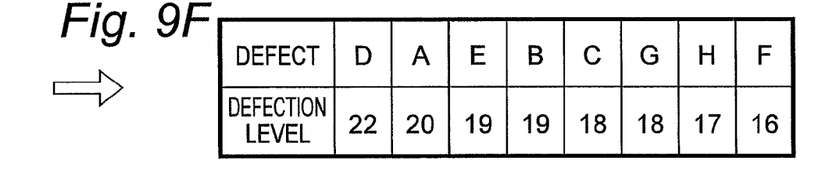

In determination of a first defect correction priority, in a first defect detection result "A, B, C, D, E", a defect with higher defection level is determined to be a defect with higher defect correction priority in order (FIG. 9D). In determination of a second defect correction priority, defects in a second defect detection result "A, D, E, G, F" (FIG. 9B) and the defects "B and C" that do not appear in the second defect detection result out of the first defect correction priority (FIG. 9D) are sorted by the defection level, and a defect with higher defection level is determined to be a defect with higher defect correction priority in order (FIG. 9E). In determination of a third defect correction priority, defects in a third defect detection result "A, E, H, G, J" (FIG. 9C) and the defects "D, B, C, F" that do not appear in the third defect detection result out of the second defect correction priority (FIG. 9E) are sorted by the defection level, and a defect with higher defection level is determined to be a defect with higher defect correction priority in order (FIG. 9F).

From the above results, according to the second example of the method of determining the defect correction priority, unlike the case of the first example, the defect B and the defect C that are considered to be the blinking defect remain in the third defect correction priority. However, the second example poses the following problem.

Figure 10A:
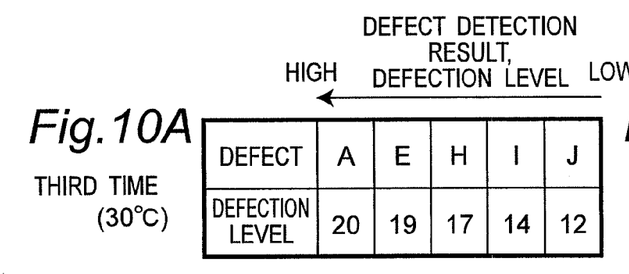
FIG. 10 is an illustration of the second example explaining effectiveness of the embodiment.
Figure 10B:
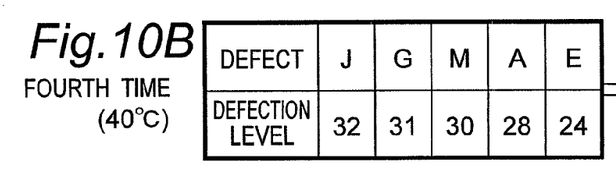
Figure 10C:
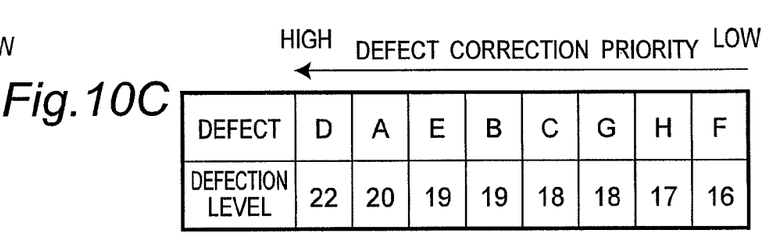
Figure 10D:
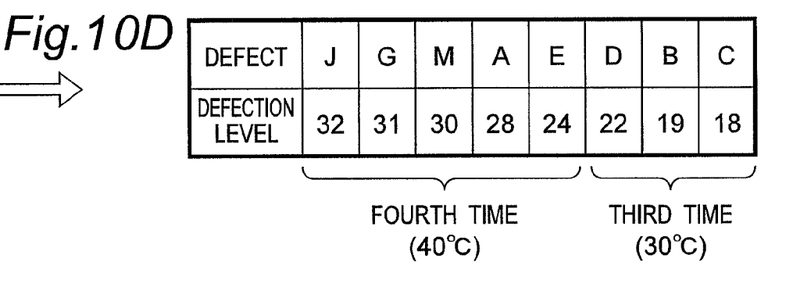

Specifically, a case is assumed in which, for example, the fourth defect detection is carried out under a situation where the temperature has risen by 10 degrees Celsius. In this case, as shown in FIG. 10B, the defection levels in the defect detection result are increased and a defect detection result (FIG. 10B) different from the third defect detection result (FIG. 10A) that has been carried out at 30 degrees Celsius is obtained. The defect correction priority is similarly determined in this situation. By sorting defects in a fourth defect detection result "J, G, M, A, E" (FIG. 10B) and the defects "D, B, C, H, F" that do not appear in the fourth defect detection result (FIG. 10B) out of the third defect correction priority (FIG. 10C) by the defection level, and by determining a defect with higher defection level to be a defect with higher defect correction priority in order, the results becomes as shown in FIG. 10D. As the defection levels differ to a large extent due to the temperature difference between the third and fourth processes, the defects in the fourth defect detection result occupies higher ranks in the fourth defect correction priority. To carry out the sorting is to compare the defection levels of the respective defects, but the comparison may not be adequate because the detection conditions are different between the third and the fourth detection.

Figure 4H:
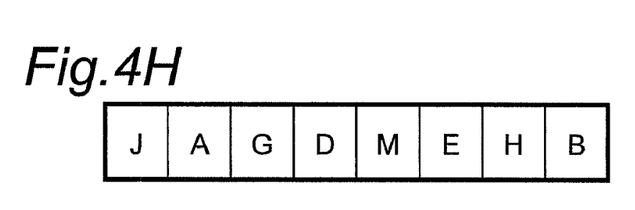

In contrast, according to the previously described embodiments, the defection levels are not used as the absolute values as in the second example, but only used in the sorting of the defect detection result. Accordingly, the sorting as in the second example is not carried out. Further, for the defect B and the defect C in FIG. 4 that are considered to be the blinking defects, the defect B with higher defection level among these two defects remains in the fourth defect correction priority (FIG. 4H). The defect C with lower defection level does not remain in the fourth defect correction priority (FIG. 4H). In this manner, the embodiments described above provide a superior method of which the defection level is taken into account in a successful manner.

Industrial Applicability

According to the defective pixel detecting device, the defective pixel detecting method, the recording medium storing a program for detecting defective pixels, and the imaging apparatus according to the present embodiment, it is possible to diminish image degradation as pixels that are stored as defective pixels in the previous defective pixel detecting process are highly possibly stored as defective pixels again in the current defective pixel detecting process, and it is possible to reduce adverse effects of differences in the temperature and the charge accumulation time that can occur due to differences in timing of the defective pixel detection thereby allowing adequate detection of the pixels to be corrected. Thus, the defective pixel detecting device, the defective pixel detecting method, the recording medium storing a program for detecting defective pixels, and the imaging apparatus according to the present embodiment are useful for devices such as imaging equipments for broadcasting and industrial purposes that require high quality video images.

While the above description is given with reference to specific embodiments, it will be apparent to a person skilled in the art that many other variations, modifications, and applications can be made. Accordingly, the embodiments are not limited to specific disclosure herein, and can be defined only by the appended claims. The present application relates to JP-A-2008-212324 (filed on 21 Aug. 2008), the content of which is hereby incorporated by reference.

What is claimed is:

1. A defective pixel detecting device determining defective pixels as correction targets in an imaging device that produces image signals, the device comprising:

a defect information storage storing priority of defective pixels to be corrected;

a defective pixel detector detecting defective pixels by comparing levels of imaging signals from the imaging device with a predetermined detection level;

a priority setter setting priority of the detected defective pixels, based on the levels of the imaging signals of the defective pixels detected by the defective pixel detector; and a correction target determiner newly determining defective pixels to be corrected based on the priority of the defective pixels out of the defective pixels that have been detected this time by the defective pixel detector and the defective pixels to be corrected stored in the defect information storage, determining priority of the newly determined defective pixels to be corrected, and storing the priority of the newly determined defective pixels to be corrected in the defect information storage.

2. The defective pixel detecting device according to claim 1, wherein the correction target determiner, when newly determining defective pixels to be corrected and determining priority, sorts the defective pixels that have been detected this time by the defective pixel detector and the defective pixels to be corrected stored in the defect information storage in order of the priority such that defective pixels that have been detected this time by the defective pixel detector are assigned with higher priority when pixels with the same priority are present, and newly selects a predetermined number of pixels in descending order of the priority as defective pixels to be corrected.

3. The defective pixel detecting device according to claim 1, further comprising:
a corrector carrying out a correct process to the defective pixels to be corrected that have been newly determined by the correction target determiner.

4. The defective pixel detecting device according to claim 2, further comprising:
a corrector carrying out a correct process to the defective pixels to be corrected that have been newly determined by the correction target determiner.

5. An imaging apparatus comprising:
an imaging device that produces image signals; and
the defective pixel detecting device according to claim 1.

6. An imaging apparatus comprising:
an imaging device that produces image signals; and
the defective pixel detecting device according to claim 2.

7. An imaging apparatus comprising:
an imaging device that produces image signals; and
the defective pixel detecting device according to claim 3.

8. An imaging apparatus comprising:
an imaging device that produces image signals; and
the defective pixel detecting device according to claim 4.

9. A defective pixel detecting method of determining defective pixels as correction target in an imaging device that produces image signals, the method comprising:
storing priority of defective pixels to be corrected in a defect information storage;
detecting defective pixels by comparing levels of imaging signals from the imaging device with a predetermined detection level;
setting priority of the detected defective pixels, based on the levels of the imaging signals of the defective pixels detected; and
determining newly defective pixels to be corrected based on the priority of the defective pixels out of the defective pixels that are currently detected and the defective pixels to be corrected stored in the defect information storage, determining priority of the newly determined defective pixels to be corrected, and storing the priority of the newly determined defective pixels to be corrected in the defect information storage.

10. The defective pixel detecting method according to claim 9, wherein
when newly determining defective pixels to be corrected and determining priority, the defective pixels that are currently detected and the defective pixels to be corrected stored in the defect information storage are sorted in order of the priority such that defective pixels that are currently detected are assigned with higher priority when pixels with the same priority are present, and a predetermined number of pixels in descending order of the priority are newly selected as defective pixels to be corrected.

11. The defective pixel detecting method according to claim 9, comprising:
correcting the defective pixels to be corrected that are newly determined.

12. The defective pixel detecting method according to claim 10, comprising:
correcting the defective pixels to be corrected that are newly determined.

13. A non-transitory computer readable recording medium storing a program for detecting defective pixels, the program being capable of determining defective pixels as correction target in an imaging device that produces image signals, the program causing a computer to function as:
a defect information storage storing priority of defective pixels to be corrected;
a defective pixel detector detecting defective pixels by comparing levels of imaging signals from the imaging device with a predetermined detection level;
a priority setter setting priority of the detected defective pixels, based on the levels of the imaging signals of the defective pixels detected by the defective pixel detector; and
a correction target determiner newly determining defective pixels to be corrected based on the priority of the defective pixels out of the defective pixels that have been detected this time by the defective pixel detector and the defective pixels to be corrected stored in the defect information storage, determining priority of the newly determined defective pixels to be corrected, and storing the priority of the newly determined defective pixels to be corrected in the defect information storage.

14. The recording medium storing a program for detecting defective pixels according to claim 13, wherein
the correction target determiner, when newly determining defective pixels to be corrected and determining priority, sorts the defective pixels that have been detected this time by the defective pixel detector and the defective pixels to be corrected stored in the defect information storage in order of the priority such that defective pixels that have been detected this time by the defective pixel detector are assigned with higher priority when pixels with the same priority are present, and newly selects a predetermined number of pixels in descending order of the priority as defective pixels to be corrected.

15. The recording medium storing a program for detecting defective pixels according to claim 13, the program further causing the computer to function as:
a corrector carrying out a correct process to the defective pixels to be corrected that have been newly determined by the correction target determiner.

16. The recording medium storing a program for detecting defective pixels according to claim 14, the program further causing the computer to function as:
a corrector carrying out a correct process to the defective pixels to be corrected that have been newly determined by the correction target determiner.

* * * * *